(12) United States Patent
Thompson et al.

(10) Patent No.: US 6,282,552 B1
(45) Date of Patent: *Aug. 28, 2001

(54) CUSTOMIZABLE ELECTRONIC INVOICE WITH OPTIONAL SECURITY

(75) Inventors: Carl Thompson, Delray Bch; Ramzi Yehia, Coral Springs; John Yin, Boca Raton, all of FL (US)

(73) Assignee: Daleen Technologies, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,529

(22) Filed: Feb. 27, 1998

(51) Int. Cl.$^7$ .................................................. G06F 17/24
(52) U.S. Cl. ........................... 707/505; 707/500; 705/34; 705/51
(58) Field of Search ................... 705/34, 40, 51, 705/54; 380/4, 24–25; 707/500, 505, 1, 4, 10; G06F 17/60

(56) References Cited

U.S. PATENT DOCUMENTS

| | | | |
|---|---|---|---|
| 5,754,657 | * | 5/1998 | Schipper et al. ................... 380/25 |
| 5,848,426 | * | 12/1998 | Wang et al. ......................... 707/505 |
| 5,862,325 | * | 1/1999 | Reed et al. .......................... 709/201 |
| 5,963,925 | * | 10/1999 | Kolling et al. ...................... 705/40 |

* cited by examiner

Primary Examiner—V. Miller
Assistant Examiner—Cuong H. Nguyen

(74) Attorney, Agent, or Firm—Jon A. Gibbons; Fleit, Kain, Gibbons, Gutman & Bongini P.L.

(57) ABSTRACT

A method on a data processing server for creating customizable electronic documents in a client-server computer network having one or more data processing servers electronically connected to a plurality of data processing clients. In one embodiment, the method provides the sender with the ability of defining, via one or more interface controls, which portions of an electronic bill are changeable and modifiable by one or more recipients. This permits the subsequent users the authority to only modify the fields as controlled by the sender.

In another embodiment, the system permits tracking of changes made by each subsequent recipient of the bill compared with the original billing data.

In another embodiment, the method provides the recipient a user preference file which controls how the bill is laid-out by the user. The combination of the sender's interface controls and the optional user preference files provides billing data to a plurality of recipients where the permissible fields to be modified or filled in are controlled by the sender and at the same time allow users to view billing data in views defined by each user in a personal preference file.

In another embodiment, authenticity and tracking history is added to the customizable electronic bill. The authenticity permits the recipient to verify the sending source and permits the sending source to view and subsequent changes or modifications made by the subsequent recipients.

In yet another embodiment, a system is disclosed for carrying out the above method on both a client and a server system.

20 Claims, 5 Drawing Sheets

FIG. 3

CUSTOMIZABLE ELECTRONIC INVOICE WITH OPTIONAL SECURITY

CROSS-REFERENCE TO RELATED APPLICATIONS

Not applicable.

BACKGROUND OF THE INVENTION

1. Field of the Invention

This invention relates in general to the field of computerized data processing systems and networks and more particularly to a method and apparatus for customizing the data content of electronic documents (e.g., electronic telephone bills) that are to be transmitted throughout a network for review or processing by one or more users of the network.

2. Description of the Related Art

The computer and telecommunications revolutions have replaced to a large degree communications on paper media. As of yet many of the advantages of this revolution have not been fully realized. There is a need to utilize the increased flexibility of communication via electronic documents.

In many organizations, employees make use of office services such as mail, express mail, and telephone for personal, non-business use. The bills for these non-business related expenditures are often rolled-up into one overall bill for the service, for example a telephone bill. In the telephone bill example an organization may ask its employees to classify which of their calls are personal and to calculate the amount of money due and necessary to reimburse the organization for these personal calls. Employees who use corporate wireless phones also need to identify their personal use. Typically, an employee calculates his personal telephone usage with calculator and pencil then notifies the accounting department of the amount due. This process can be tedious and prone to arithmetic and classification errors. Other employees may make use of standalone software applications like Quicken™ or Microsoft Money™ to record and categorize each expense. Even using these standalone software applications the reimbursement process is still prone to errors during the data entry and data collection. A need exists for automatic data collection, classification and calculation of electronic bills.

In other instances, organizations often need to track telephone calls for client billing purposes. Many times law firms and other service organizations itemize individual telephone charges for clients. The categorizing and calculating of telecommunications, federal, and state taxes is often complex. Electronic delivery of billing data for services is well known. Many service providers, telecommunications providers and electronic commerce vendors deliver their bills electronically and in some cases for large customers, deliver bills on CD-ROMs. These electronic bills delivered electronically, are usually in the same format as their paper bill counterparts and are not readily customizable. In the case of electronic bills on CD-ROM, even though they may be made customizable, such customization requires sophisticated software and cannot be done by individual employee in the company. Therefore, a need exists for customizing the calculation of taxes and apportioning taxes associated with each service bill delivered electronically.

Many times in organizations, electronic billing data is routed to several people in a given department. The process often begins with staff in accounting where the electronic billing data for telephone usage for a given department is sent to a department head. The department head may then forward the electronic billing data via E-mail to a specific employee or group of employees for reconciliation. Electronic billing data is much more susceptible to undetectable data manipulation than their paper bill analogs. Manipulating bits in an electronic billing data does not lend itself to discovery like alterations or manipulation of erasures, strike-outs or whiteouts in the paper analogs. Therefore it is desirable in customizable electronic bills to ensure the integrity of the original billing data. This data integrity requirement is even more important in circumstances where the electronic bill is "bucked around" to several different people for reconciliation. Continuing with the department head example, the department head may manipulate electronic billing data before it is forwarded to the employees. The employees may make subsequent manipulations and modifications such as the categorization of bills to simplify the payment reconciliation's. Afterwards, the employee sends back the modified bill electronically to the department head to be combined or rolled-up into one reconciled bill for accounting. Each recipient along the billing reconciliation route wants to view and understand the data manipulations that were made prior to him/her receiving the bill. A need exists for recipients of electronic billing data to verify the authenticity of not only the original billing data but every subsequent modification or manipulation made to the billing data. Therefore, there exists a need in the art for a method and apparatus to provide customizable electronic billing data with data integrity and which overcomes the above problems.

SUMMARY OF THE INVENTION

Briefly, in accordance with the invention, an information processing system for creating customizable electronic documents comprises: a document generator for generating data content in at least one of the electronic documents for review by a user; and transmission means for providing a transmission comprising the at least one of the electronic documents, a plurality of rules setting forth permissible comments and modifications of the document, and the originator authentication data.

BRIEF DESCRIPTION OF THE DRAWINGS

FIG. 3 is an illustration of a Web browser displaying an example user billing data according to the present invention.

DETAILED DESCRIPTION OF AN EMBODIMENT

Figure 1:
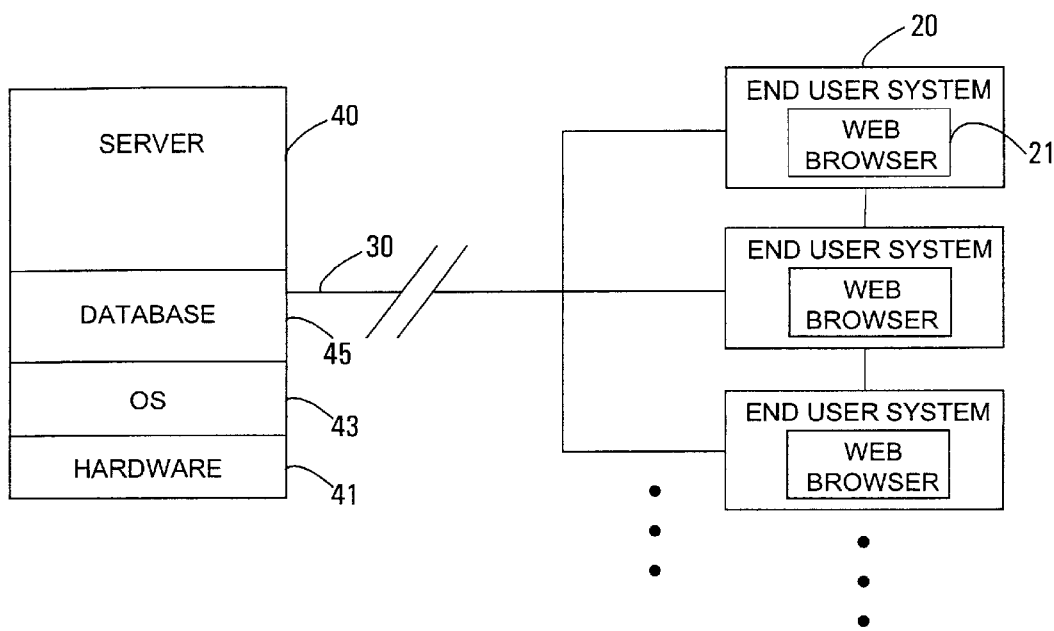
FIG. 1 is a block diagram of the major electrical components of a client-server computer system used in accordance with this invention.

Referring to FIG. 1, there is shown a block diagram of a client-server system 10. The system comprises a plurality of end-user data processing systems 20 running a Web browser 21 connected to a network 30. The system 10 is used for the production of electronic documents for transmission and circulation among various users of end user units 20. One particularly useful application of the system is to generate documents containing customizable billing data to be circulated to one or mode users of the units 20.

The data processing systems 20 can be any general purpose microcomputer such as IBM compatible PCS, Apple Macintosh or any thin client with sufficient hardware capability for running Web browser 21. Each unit 20 comprises a communication interface 21 for communicating with other units within system 10 or other units or networks outside the system 10. The communication interface 21 can be implemented as a Web browser (e.g., a client software program based upon Hyper-Text-Transfer-Protocol (HTTP)). Examples of existing communication interfaces include the Netscape Navigator, JAVA Browser, Lotus Notes or Microsoft Internet Explorer. The network 30 includes any of a variety of network connection protocols such as Ethernet or Token Ring running software packet protocols such as TCP/IP that support HTTP transmissions. The server 40 can be any Intel processor, IBM RISC, HP RISC, Sun Parc or DEC Alpha or equivalent microprocessor based hardware system 41 running a compatible operating system 43, such as, AIX, OS/2, Solaris, Windows NT, or UNIX. Operating systems 43 supports any popular database server 45, such as, Database/2, Informix, Domino, Access. It is important to point out that the precise operating systems and hardware configurations of data processing systems 20, network 30 and server 40, are not limited to any specific hardware or software configuration. These systems can be implemented on a wide variety of hardware and software platforms that are well known in the art and are within the true spirit of this present invention.

Figure 2:
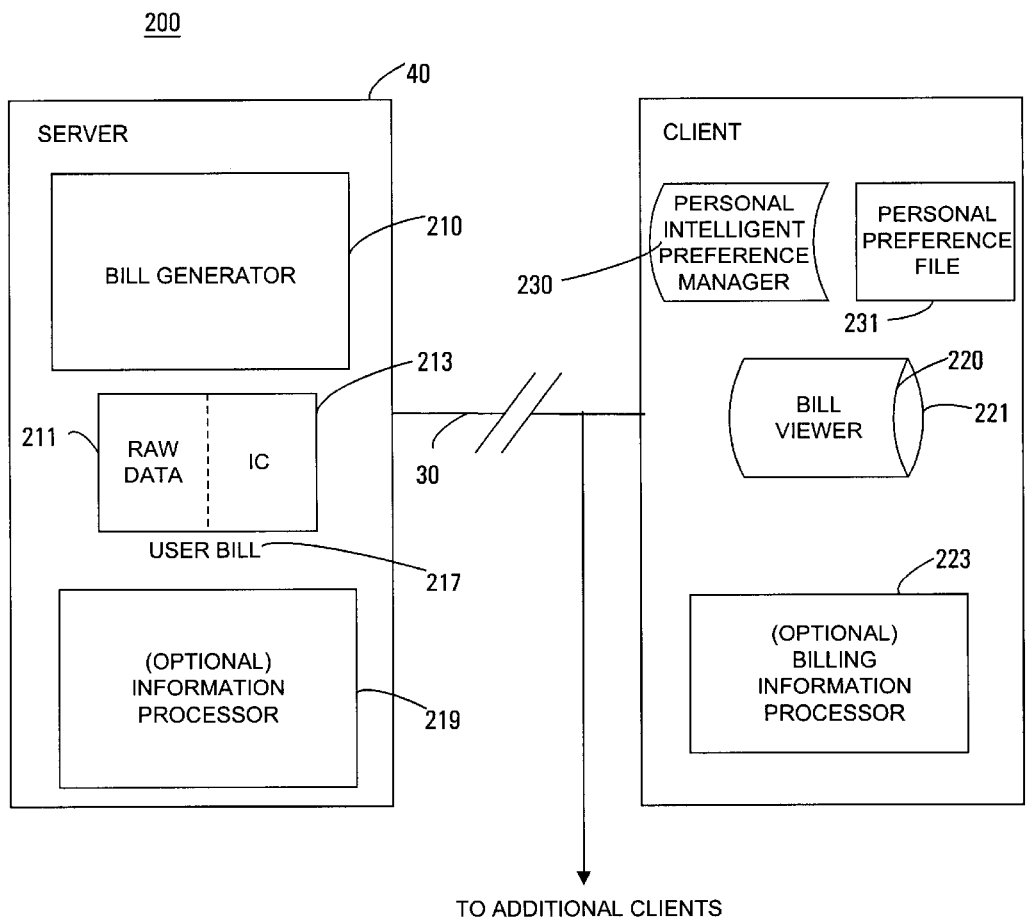
FIG. 2 is a functional block diagram of the major components for hosting intelligent billing processing according to the present invention.

Referring now to FIG. 2 shown is a functional block diagram of the major components of a system 200 for use in transmitting electronic documents containing certain data content for review or processing by at least one of the users of the system 10. In this example, the documents circulated are electronic bills including billing data that is customizable by a user according to certain user preferences and rules limiting the customization. A billing generator 210 collects raw billing data 211 from a database server 45 of FIG. 1 for a specific application. In a telephony application example, the typical information included in the raw billing data includes the telephone number from which the call was originated, the telephone number called, the time of day the call was made, the length of the telephone call, the billing rate and the tax charges. The raw billing data 211 is combined with interface controls 213 to create an electronic user bill 217. Interface controls are built using Hyper Text Markup Language (HTML) to create controls including check-boxed selections, radio button or dial-type selections, drop-down selection lists and push button selections.

Figure 3:
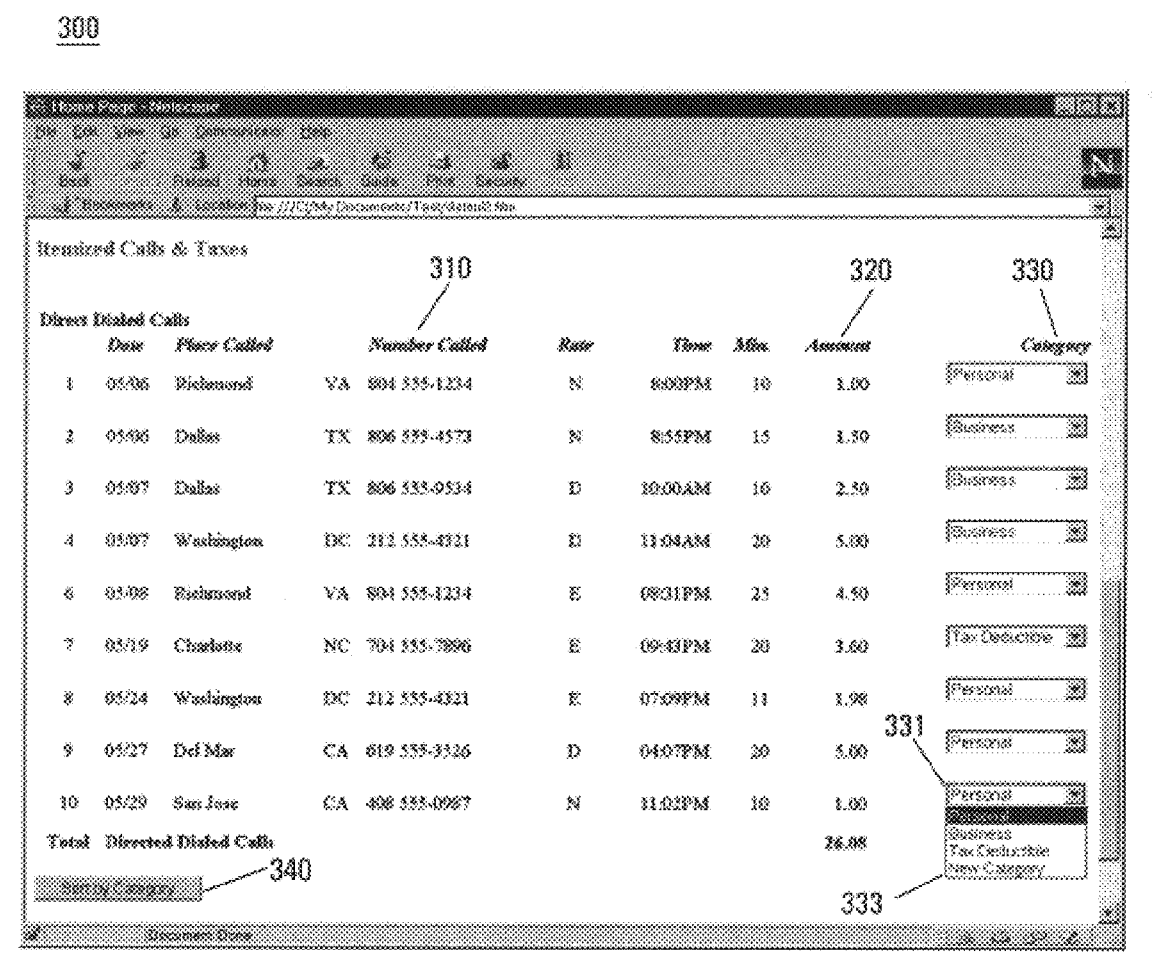

User bill 217 is electronically mailed or E-mailed from the server unit 40 over the network 30 to one or more selected data processing client units 20. Each selected data processing client unit 20 contains a billing viewer 220 running HTML enabled Web browser 21 and receives the E-mailed user bill 217. A personal intelligent preference manager 230 includes lists of preferences for the specific data processing client 231. Referring now to FIG. 3 is an illustration of a Web browser displaying an example user billing data 300 according to the present invention. Illustrated is an HTML drop-down list category box 330, for categorizing each telephone call. Some default category entries come with the bill and additional entries 331 can be stored in a preference manager file 231. Example categories for telephone call 331 depicted include: personal, business, tax deductible, and new category. A user can select any desired category for a call. If there is no appropriate category having been defined for a particular call, the user can add additional categories by selecting new category 333 selection of category box 330. The user then simply types in the new category description in a dialog box (not shown) and the category is inserted as a category entry 331. Once a call is categorized by the user, the mapping between the destination or phone number called and 311 is stored in the personal preference manager file 231. The next time, an electronic user bill 217 is received, a call made to this destination is automatically put into the particular category that was previously selected by the user. Views of the categorized calls can then be sorted and viewed by selecting the sort by category button 340.

Besides sorting the telephone calls into each category, new subtotals are calculated, along with the applicable rates, discounts and taxes for the telephone calls. This sorting for categories can be accomplished in several alternative means. A first sorting means is accomplished by using a JAVA applet that is E-mailed with the user bill 217 itself. As new requirements for sorting are needed, the JAVA applet is updated at server 40 and automatically sent with each user bill 217. Another sorting means allows uses of a local billing information processor 223 residing on the data processing clients 20. Billing information processor 223 is a standalone program for sorting many popular PC compatible spread sheet programs or database programs running on data processing clients 20 and can be used by communicating to user bill 217 through mechanisms such as Microsoft's Object Linking and Embedding (OLE) techniques. Another sorting means is through the use of a plug-in for Web browser 21. Plug-ins for category type sorting functionality are available through Corel's Perfect Office Suite or Lotus eSuite line of products. Still another means is to have the sorting functionality be information processor 219 performed by an application running on server 40 and the resulting view sent to the user. The reformatted bill can then be forwarded by the billing user to a client or employer for reimbursement and payment.

Figure 4:
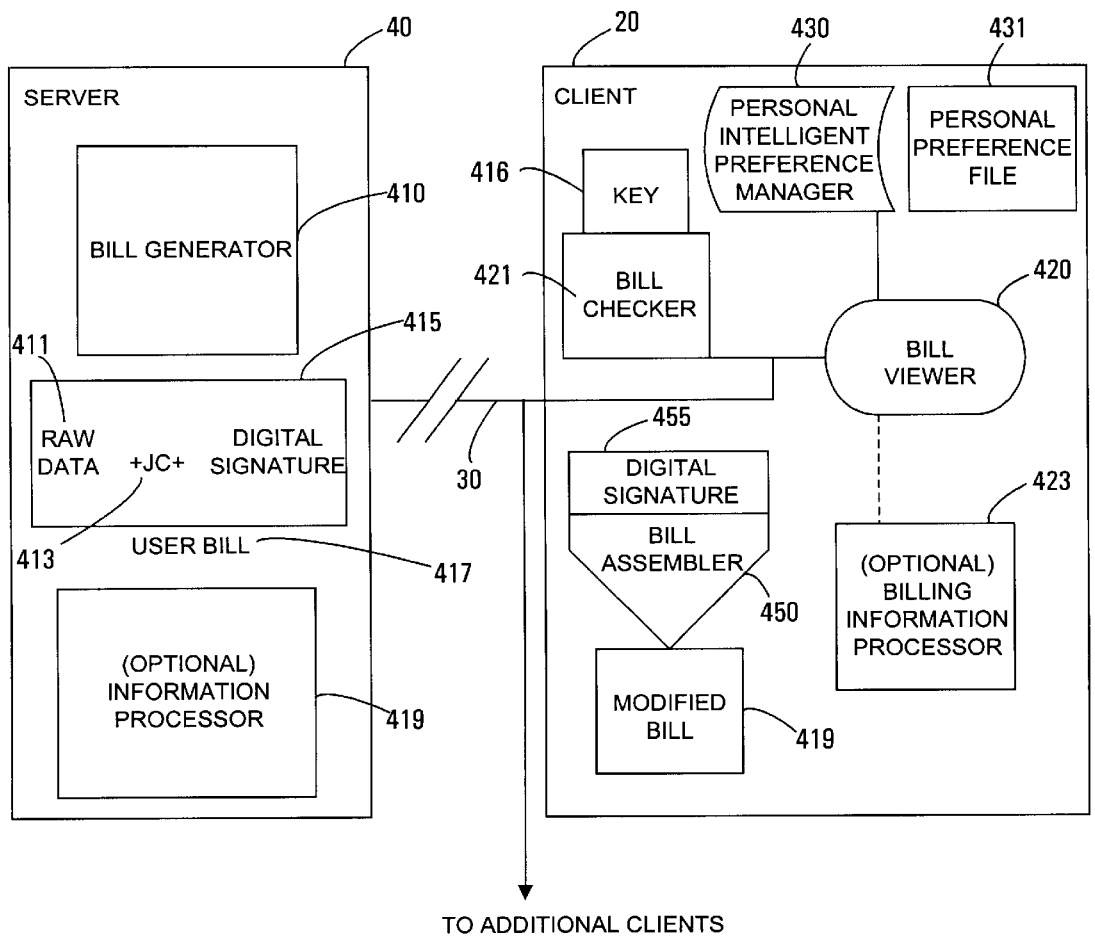
FIG. 4 is a functional block diagram illustrating another embodiment of FIG. 2 with data authentication.

In another embodiment, the customizable user bill 217 preserves the authenticity of each sender. A digital signature is appended to each user bill 217. The digital signature uniquely identifies the sender. Referring to FIG. 4 there is a functional block diagram illustrating another embodiment of FIG. 2 with data security using digital signatures. The bill generator 410 combines the raw billing data 41 1, the interface control 413 and a sender's digital signature 415. The user bill 417 is electronically sent over network 40 to one or more selected data processing clients 20. The bill checker 421 on selected data processing clients 20 verifies that the user bill 411 is sent from the originator by comparing the senders digital signature 415 with a local reference key 416. If the digital signature 415 matches, under a selected cryptographic algorithm, exactly the local reference key 416, the user bill 417 is passed onto bill viewer 420 as discussed in the previous embodiment. (For network 40 applications where security may be questionable such as the Internet, a public-key system may be used where a digital signature encrypted with a private key uniquely identifies the sender and connects the sender to the exact message. Under a public key system, anyone holding the public key can then verify the integrity of the signature. In this embodiment, the local reference key 416 can be viewed as the public key.) The recipient is allowed to make modifications to the bill in any fields previously authorized. Returning to FIG. 3, the telephone example, it would be common for a telephone bill to allow a recipient to change the category but not change the value in amount column 320. The authorization for each field is specified by and stored in the original bill. It cannot be modified. The modifications such as automatic categorization can be done by personal preference manager 430 for telephone numbers dialed if it is indicated so in the personal reference file 431.

Once the recipient has completed all the changes he is authorized to perform, the recipient can then forward the bill to another party. Bill assembler 450 assembles the modifications the user makes, these changes are signed with the senders digital signature 455 and appended to the original user bill 417 to create a modified bill 419. The subsequent recipient(s) 470 using a bill checker 421 running on data processing client(s) 20 verifies the origin of the bill. The subsequent recipient(s) 470 of this modified bill 419 is able to view both the original bill 417, and the modified bill 419.

Figure 5:
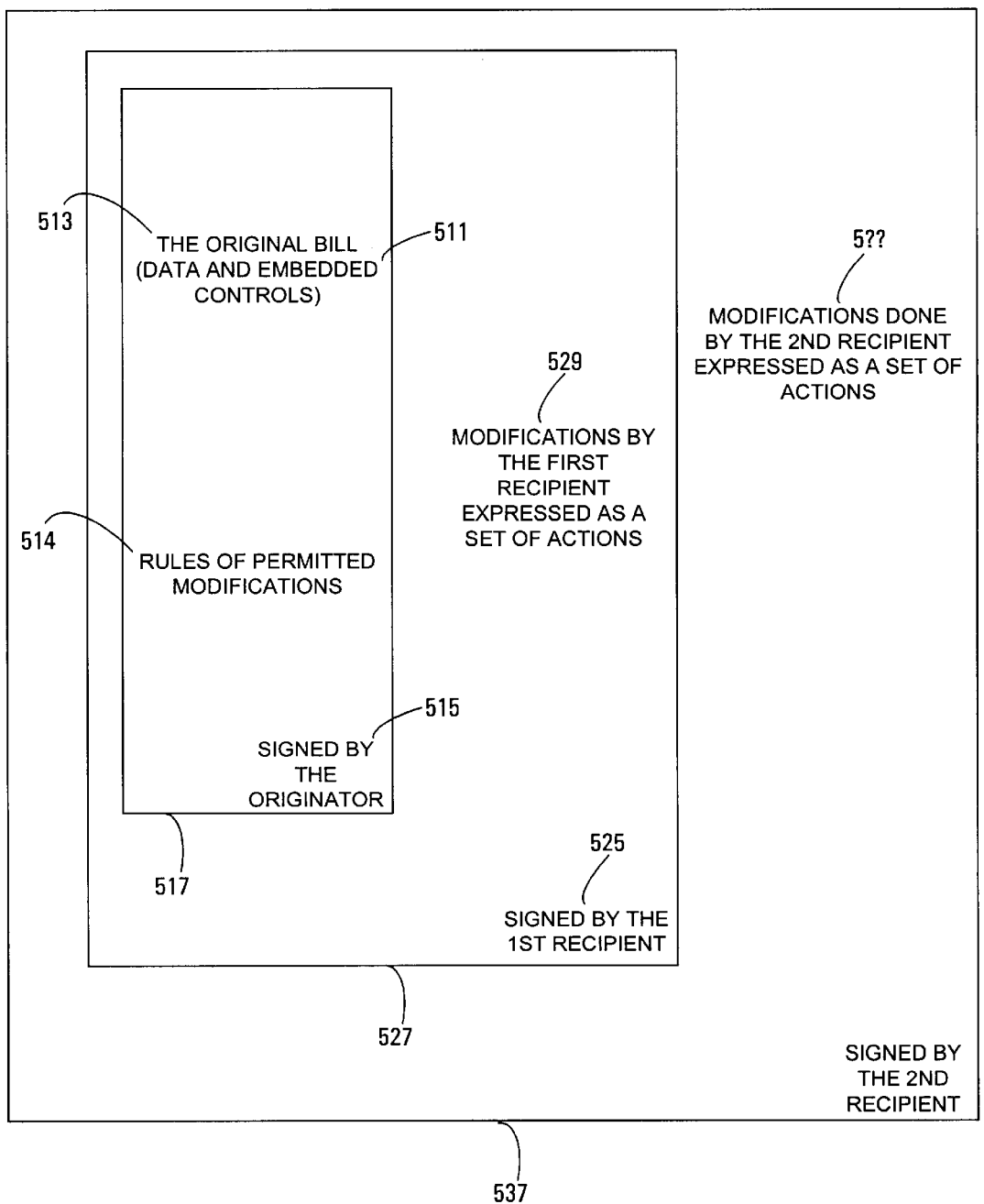
FIG. 5 is an illustration of nested authentication according to the present invention.

FIG. 5 is an illustration of three levels of nested authentication according to the present invention. The first level, original bill 517 is shown with the corresponding digital signature 515. The first recipient makes authorized revisions 529 in accordance with rules 514 to the original bill 517, now expressed as modified bill 527 in the second level. Bill 527 also includes the digital signature of the first recipient. Now subsequent recipient(s) can modify the original user bill 517 as authorized by rules 514 sent along with modified bill 527. In the third level, modified bill 527 is modified and signed for a second time expressed as subsequent modified bill 537. During each level of modification, the user can view all changes to the original bill 517. For the third level of modification, the user can view both the original bill 517 and authenticate the corresponding digital signature 515 as well as view the second level contain the subsequent modified bill 527 and authenticate a second corresponding digital signature 525.

While the invention has been illustrated and described in the preferred embodiments, many modifications and changes therein may be affected by those skilled in the art. It is to be understood that the invention is not limited to the precise construction disclosed herein and that the scope of the invention is defined only by the claims appended hereto and equivalents. Accordingly, the right is reserved to all changes and modifications coming within the true spirit and scope of the invention.

What is claimed is:

1. An information processing system for creating and distributing customizable electronic bills with nested levels of permission control, to one or more user systems coupled therewith, the information processing system comprising:

a billing generator for generating billing data;

one or more interface controls for use on the one or more user systems for controlling one or more rules setting forth permissible comments and modifications for use in one or more electronic, bills, wherein the comments and the modifications which are permissible are displayed as governed by the interface controls on the one or more user systems and wherein the comments and the modifications which are not permissible are hidden from display as governed by the one or more interface controls on the one or more user systems;

combining means for combining the billing data with one or more interface controls to form one or more electronic bills with embedded controls, wherein the electronic bill is capable of being viewed and modified on one or more user systems, and that the one or more user systems using the embedded controls, are able to set forth a set of comments and modifications permitted to be made by the one or more subsequent recipients of the one or more electronic bills; and transmission means for providing a transmission of the one or more electronic bills to the one or more user systems.

2. The information processing system of claim 1 wherein the one or more interface controls are written in HTML compatible code.

3. The information processing system of claim 1 wherein the control data includes a control selected from the group consisting of check-box, radio button, drop-down and push button.

4. The information processing system of claim 1, wherein the billing data includes data for a telecommunications service.

5. The information processing system of claim 1 for identifying the origin of the billing data and wherein the combining means further includes combining the authentication data along with the billing data and the one or more interface controls to form one or more electronic bills.

6. The information processing system of claim 1 further comprising:

means for receiving the billing information from a database server, the billing information to be included with the data content.

7. The information processing system of claim 1 further comprising:

means for receiving processing commands from a user via the one or more user systems, the processing commands instructing the information processing system to perform sorting, calculating, and formatting operations on the billing data in the one or more electronic bills.

8. The information processing system of claim 6 further comprising:

a processing unit for processing the processing commands received; and wherein the transmission means for providing a transmission of the one or more electronic bills to the one or more user systems include proving billing data processed by the processing unit.

9. A client information processing system for receiving and resending customizable electronic bills with nested levels of permission control, comprising:

means for receiving electronic bills from a server system, the electronic bills comprising billing data and one or more embedded interface controls for controlling one or more rules setting forth permissible comments and modification during review of the electronic bill by at least one user;

means for receiving a user preference file; and a bill viewer for controlling the presenting and formatting of the billing data according to the user preference file and the interface controls, including the presentation of one or more user embedded interface controls to set forth permissible subsequent comments and subsequent modifications for use by one or more subsequent recipients of the electronic bills, wherein the comments and the modifications which are permissible are displayed as governed by the interface controls on the one or more user systems and wherein the comments and the modifications which are not permissible are hidden from display as governed by the one or more interface controls on the one or more user systems.

10. The information processing system of claim 9 further comprising:

capture means for capturing modifications made by a first user of the billing data separately which is then appended to the original unmodified billing data for subsequent review by second user.

11. The information processing system of claim 9 further comprising:

E-mail means for electronically mailing the billing data to one or more subsequent users.

12. The information processing system of claim 9 further comprising:

originator authentication means for identifying the user of the billing data and subsequent modification.

13. The information processing system of claim 9 further comprising:

authentication means for proving that the billing data in the received document is substantially identical to the billing data received.

14. The information processing system of claim 9 wherein the billing data include billing for a telecommunications service.

15. A method on a data processing server for creating and distributing customizable electronic bills with nested levels of permission control in a client-server computer network having one or more data processing servers electronically connected to a plurality of data processing clients comprising the steps of:

generating billing data;

assembling one or more interface controls for use on the one or more data processing clients for controlling one or more rules setting forth permissible comments and modifications for use in one or more electronic bills, wherein the comments and the modifications which are permissible are displayed as governed by the interface controls on the one or more user systems and wherein the comments and the modifications which are not permissible are hidden from display as governed by the one or more interface controls on the one or more user systems;

combining the billing data with the one or more interface controls to form one or more electronic bills with embedded controls, wherein the electronic bill is capable of being viewed and modified on the one or more data processing clients, and that the one or more data processing clients using the embedded controls are able to set forth a set of comments and modifications permitted to be made by one or more subsequent recipients of the electronic bills; and transmitting one or more electronic bills to the one or more data processing clients.

16. The method of creating customizable electronic documents of claim 15 further comprising the step of:

identifying the origin of the billing data and wherein the step of combining further includes combining the authentication data along with the billing data and the one or more interface controls to form one or more electronic bills.

17. The method for creating customizable electronic documents of claim 15 further comprising the step of:

capturing a user preference file for controlling one or more user's preferences for viewing the billing data on at least one or more data processing clients and wherein the step of combining the billing data with the one or more interface controls to form one or more electronic bills further includes combining the user preference file.

18. The method of creating customizable electronic documents of claim 15 further comprising the steps of:

receiving processing commands from a user via the one or more data processing clients, the processing commands instructing the one of more one or more data processing servers to perform sorting, calculating, and formatting operations on the billing data in the one or more electronic bills;

processing the processing commands received; and wherein the step of transmitting includes transmitting billing data processed in response to a processing command.

19. A method on a data processing client for receiving and resending customizable electronic bills with nested levels of permission control in a client-server computer network comprising one or more data processing servers running database server electronically connected to a plurality of data processing clients, the method comprising the steps of:

receiving electronic bills from a server system, the electronic bills comprising billing data and one or more embedded interface controls for controlling one or more rules setting forth permissible comments and modification during review of the electronic bill by at least one user, wherein the comments and the modifications which are permissible are displayed as governed by the interface controls on the one or more user systems and wherein the comments and the modifications which are not permissible are hidden from display as governed by the one or more interface controls on the one or more user systems;

receiving a user preference file; and controlling the presenting and formatting of the billing data according to the user preference file and the interface controls, including the presentation of one or more embedded user interface controls to set forth permissible subsequent comments and modifications for use by one or more subsequent recipients of the electronic bills.

20. The method of creating customizable electronic invoices of claim 19 further comprising the steps of:

capturing modifications made by a recipient of the billing data separately which is then appended to the original unmodified billing data for review by a subsequent user.

* * * * *